Dec. 26, 1967  R. C. COOPRIDER  3,359,917
LIQUID DISPENSER
Filed March 1, 1966
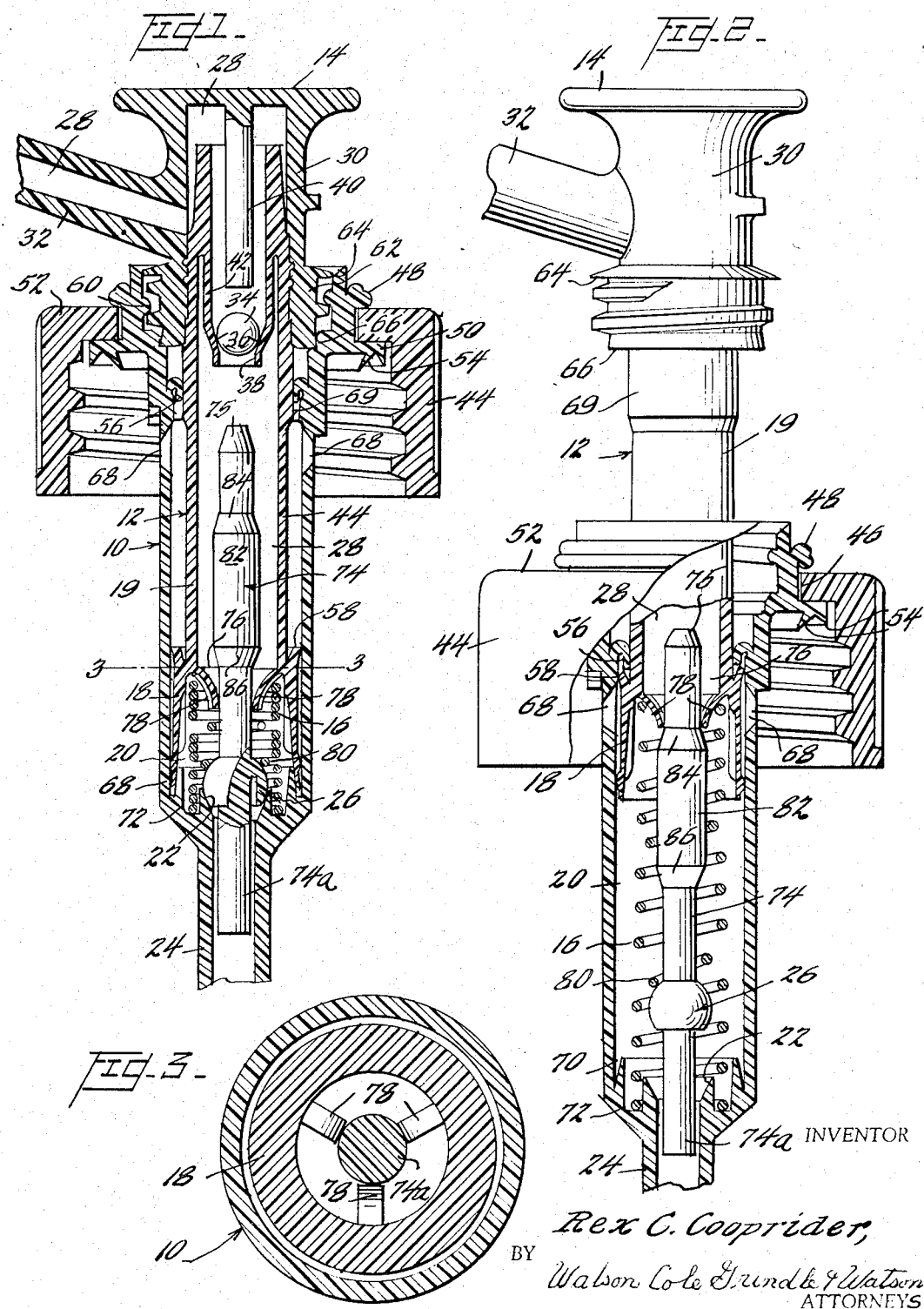
INVENTOR
Rex C. Cooprider,
BY Watson Cole Grindle & Watson
ATTORNEYS United States Patent Office 3,359,917
Patented Dec. 26, 1967

3,359,917
LIQUID DISPENSER
Rex C. Cooprider, Hacienda Heights, Calif., assignor to Calmar, Inc., City of Industry, Calif., a corporation of California
Filed Mar. 1, 1966, Ser. No. 530,853
8 Claims. (Cl. 103—188)

ABSTRACT OF THE DISCLOSURE

The invention relates to a reciprocating plunger-type pump having a novel clutching means interconnecting the plunger and inlet valve for transmitting a maximum seating thrust at the inception of the compression stroke and for thereafter continuing to transmit a continuing lesser thrust throughout at least a portion of the remainder of the stroke.

---

This invention relates to improvements in liquid dispensing pumps of the type commonly applied to and sold as attachments for portable liquid containers.

Such pumps are frequently employed for the dispensing of liquids of a viscous, sticky, and sometimes semi-plastic nature, having characteristics tending to interfere with the proper seating or unseating of the pump valves. Also, during use of such pumps in connection with portable containers, the pumps may be wholly or partially inverted during operation, thereby rendering the pump valves unreliable where reliance is had solely upon gravity and/or pressure differentials for seating and unseating of the valves.

These considerations apply particularly to the pump inlet valves, the reliable operation of which is of primary importance.

With the foregoing considerations in mind, the primary objects of the invention are: to provide, in a reciprocating plunger-type pump, a novel clutching means interconnecting the plunger and inlet valve for transmitting a maximum seating thrust from the plunger to the inlet valve at the inception of each plunger compression stroke, and preferably also for thereafter continuing to transmit from the plunger to the inlet valve a continuing though lesser seating thrust throughout a portion at least of the remainder of said stroke; to utilize the plunger spring for transmitting a resilient seating or closing force from the plunger to the inlet valve at the inner limit or end of the plunger compression stroke; and to so arrange the said clutching means as to transmit a strong unseating or opening thrust to the inlet valve shortly following inception of the outward or suction stroke of the plunger; to time said unseating thrust to occur only following release of the inlet valve from the seating or closing action of the plunger spring; and to so coordinate and interrelate the movements of said parts as to provide for sufficient range of movement of the plunger and gathering of sufficient momentum thereof on its suction stroke prior to its unseating thrust against the inlet valve, that such momentum may supplement the force of the spring in unseating the inlet valve during the early stages of the suction stroke.

It is a further more general object to provide such a pump which is capable of simple and reliable construction and operation, and which may be readily produced primarily by conventional plastic molding operations of usual plastic materials.

In the accompanying drawings and the following detailed description of a preferred embodiment of the invention, specific terminology will be employed to designate various of the parts and their relative orientation. However, it will be appreciated that the preferred embodiment thus disclosed is merely by way of exemplification, and that various of the details and features thus disclosed are subject to modification or elimination without departing from the invention, except as specifically required by the appended claims.

In the accompanying drawings:

FIGURE 1 is a view in section in an axial plane through a liquid dispensing pump in accordance with the invention, showing the pump plunger as secured in its fully-depressed position somewhat beyond the normal inner limit of the plunger compression stroke;

FIGURE 2 is a view generally similar to FIGURE 1, but showing certain conventional parts in elevation, with the plunger at the extreme limit of its outer or suction stroke; and FIGURE 3 is a somewhat enlarged detail section on the line 3—3 of FIGURE 1.

Referring now in detail to the accompanying drawings:

First, considering the general organization of elements, the pump structure shown in the drawings comprises a pump cylinder 10, through the open outer end of which reciprocates the hollow pump plunger 12, which is adapted for reciprocation in known manner through the application of intermittent finger pressure, preferably on a suitably-conformed finger piece 14 at its axially-outer or upper end. Inward finger pressure on the plunger produces the compression stroke thereof and same is returned on its suction stroke preferably by means of the spring 16.

A piston structure 18 at the inner end of the tubular plunger rod 19 cooperates with the closed inner end portion of the cylinder to define a variable volume pump chamber 20.

This pump chamber 20 is provided with a suitably-located inlet port 22 which communicates with the liquid contents of the container preferably through a conventional dip tube 24 which may constitute an integral extension of the cylinder 10.

The inlet valve 26 which is disposed to control the opening and closing of the port 22, incident to its axial reciprocation, is arranged to permit entry of liquid through the port and into the compression chamber 20 on each outward suction stroke of the plunger 12 and to close the said port at the inception of each compression stroke of the plunger.

The plunger itself is formed to define a discharge passage 28 extending completely therethrough from the pump chamber 20, and through which the liquid is delivered upwardly for discharge at the outer or exterior end of the plunger preferably through a conventional plunger discharge head 20, on which the finger piece 14 is formed. The discharge head 30 is here shown as provided with a discharge spout 32, through which the outlet passage 28 extends, via the blind socket in the plunger head, which receives the upper end of the plunger rod.

For preventing any substantial backflow of air or liquid through the plunger and toward the pump chamber, it is desirable to provide at a suitable location within the discharge passage 28 of the plunger rod 19, a conventional ball check valve 34 cooperating in conventional manner with the valve seat 36 and the port 38 defined thereby. A stop finger 40 carried by the plunger discharge head and projecting axially into the outwardly-opening end of the main discharge passage 28 through the plunger rod serves to limit the unseating movement of the valve 34. A cylindrical sleeve 42, preferably formed integrally with the hollow plunger rod 19 within the passage 28, functions both as a valve cage and as a means for defining both the valve seat 36 and port 38.

The dispensing pump here shown, though by no means limited to such use, is primarily intended for application to conventional containers, such as bottles and the like, in which various liquids, as for instance cosmetic preparations, medicines and numerous other liquid or semiplastic preparations, are sold. To this end, in the preferred form, it is suitably adapted for disposition through the discharge outlet of such a container, of which only the conventional internally-threaded closure cap 44 is here illustrated. To adapt the pump for such use, the pump cylinder is formed at its upper end with an encircling collar 46, which is disposed through an opening into the wall 52 of the container closure 44. Radial flanges 48 and 50 respectively on the collar axially abut against the upper and lower faces of the top wall 52. The flange 48, which in accordance with usual practice is formed by a conventional swaging operation after positioning of the cylinder through the opening, abuts axially against the top wall 52, thus cooperating with the flange 50 to secure the cylinder against axial displacement. If desired, the flange 50 may be provided with suitable sealing means such as at annular ribs 54 for engagement with the end of an externally-threaded container neck.

In the instant embodiment, the upward or outward movement of the plunger on its suction stroke is limited by means of the annular stop ring 56, which is formed after insertion of the piston 18 into the cylinder during the assembly of the parts. The stop ring or shoulder 56 may be formed simply by swaging or deforming a portion of the collar material in a manner which is now well known in the art. This stop shoulder 56 is adapted for axial limiting abutment with the upwardly-presented annular edge 58 of the piston.

For sealing the pump to prevent escape of liquids during shipping and storage, the same is provided with conventional means for securing the plunger in its fully-depressed condition, as exemplified in the present instance by the internally-threaded socket 60 of the collar for releasable reception of the externally-threaded plug 62 around the base of the plunger head. The plug 62 and the collar are provided with cooperating annular seals 64 and 66 respectively in accordance with conventional practice to prevent escape of liquid such as might enter the cylinder from the container through the conventional venting openings 68. As is well known, such vent openings 68 permit communication between the container interior and the external atmosphere for pressure equalizing purposes during normal operation of the pump, it being apparent that these vents or vent openings 68 communicate with the cylinder above the piston and that the stop ring 56 normally permits entry of air from the open end of the cylinder between the cylinder wall and plunger, but is substantially closed and sealed by the enlarged portion 69 of the plunger rod, when the plunger is fully depressed, as in FIGURE 1. The lower end of the pump chamber is formed with an annular groove 70 concentrically surrounding both the inlet port 22 and the annular spring seating groove 72. This groove 70 snugly receives the depending skirt of piston 18, in the position shown in FIGURE 1, to effect a seal barring flow from the pump chamber 20 outwardly between the plunger and cylinder.

The construction and operation of the pump structure as thus far generally described are conventional, being substantially disclosed in the Corsette U.S. Patent No. 3,128,018, of Apr. 7, 1964. The instant invention consists in specific improvements in the construction and correlation of the pump cylinder, the pump inlet valve 26, the plunger 12, and their associated components as hereinafter described.

Referring now more particularly to the inlet valve 26, the operative portion of same is of generally-external spherical configuration for axial seating and unseating movement in the outwardly-flaring upper end of the inlet port 22 between the seated and unseated positions shown respectively in FIGURES 1 and 2.

The valve 26 is yieldably coupled to the plunger by means of a rigid valve stem 74, which extends outwardly through the pump chamber and into the inwardly-opening discharge passage 28 of the plunger in telescopic association with the plunger. If desired, the valve stem 74 may include a guide or pilot portion 74a extending inwardly or downwardly from the valve 26 and freely movable through the port 22 and its associated dip tube 24 to function both as a pilot and guide during assembly of the inlet valve within the plunger. This guide 74a also functions to assist in maintaining the desired axial centering or alignment of the inlet valve in the pump cylinder during its operation. It will be noted, of course, that the valve stem guide portion or extension 74a has sufficient clearance within the tube 24 and port 22 as to avoid any undesirable obstruction of the flow of liquid through them.

Similarly, it is to be noted that the telescopically associated portions of the plunger 19 and the inlet valve stem 74 are relatively shaped and proportioned to provide a clearance space, indicated by the numeral 76, between them, constituting a portion of the discharge passage 28.

The valve stem and the plunger respectively are provided within the plunger passage 28 with suitable clutch means for establishing a yieldable coupling between the plunger 19 and the inlet valve 26 without unduly obstructing the clearance space 76 or other portions of discharge passage 28, and capable of actuating the inlet valve independently of gravity and/or fluid pressures.

Such clutch or clutch means comprises a plurality of clutch fingers 78 respectively circumferentially spaced in annular configuration around the valve stem or portion 74, with the opposite radial extremities of the fingers normally abutting radially inwardly and outwardly respectively against the valve stem or portion 74 and the surrounding portion of the plunger.

Corresponding radial extremities of the fingers 78 are connected to one of the said portions, here exemplified by the plunger, at fixed axial locations thereon for radial swinging movement of their opposite or inner extremities which, in the present instance, are in sliding frictional engagement with the valve stem 74.

The clutch fingers 78 preferably are molded integrally with the rest of the plunger structure, of a suitable material having sufficient resiliency as to inherently afford the necessary radial yielding or swinging of the free inner ends of the fingers. In addition, the gripping action of the fingers on the valve stem 74 is augmented by means, here exemplified by the plunger spring 16, which is employed in novel manner to perform the dual functions of projecting the plunger on its outward or suction stroke and also of resiliently urging the fingers into frictional engagement with the valve stem.

Thus, it will be seen that the spring 16 in the present embodiment has its upper end seated against the gripping fingers 78 at a radial location somewhat inwardly of their connections to the plunger, as is best shown in FIGURE 2.

In transmitting the spring pressure to the plunger proper, it will be readily apparent that the free inner ends of the fingers 78 will be urged radially inwardly to increase their radial pressure against and in frictional engagement with the valve stem 74.

It is, of course, a prerequisite to this function that the fingers are all similarly inclined to the axis of the plunger and cylinder, with the free ends thereof directed inwardly in an axial direction toward the valve port 22 so as to be urged radially by the spring pressure. It is thus to be noted that the gripping fingers or clutch fingers 78 function as clutch means or members and also to define a spring seat for abutting engagement with the outer or upper end coil of the spring.

By virtue of the frictional gripping relationship between the clutch fingers 78 and the inlet valve stem 74, the valve is yieldably thrust toward or away from its cooperating port 22 in accordance with the direction of movement of the plunger 12.

The seating or closing movement of the inlet valve 26 is limited by its seating reception in the port 22, while its unseating movement is limited by means of a restricted coil 80 of the spring 16. The port 22 and the constricted coil 80 thus conjointly function as means for confining the inlet valve 26 to a predetermined range of operative movement which is obviously substantially less than the plunger stroke. Therefore, the interconnections between the plunger and inlet valve will cause the valve to be seated and unseated by movement with the plunger through the initial portion of the plunger compression and suction strokes respectively. However, as soon as the inlet valve reaches the limit of its permissible range of movement in either direction, the frictional yielding connection between the inlet valve and plunger permits continued movement of the plunger alone for the balance of its operative stroke.

In order that the plunger may transmit a maximum seating thrust to the valve 26 to insure its prompt closing at the inception of each compression stroke, and thus to improve its functioning for the handling of viscous or semiplastic liquids or materials, the valve stem 74 is provided with a radially-enlarged cylindrical frictional gripping surface or portion 82 intermediate of its length and nearly coextensive with its range of relative movement in engagement with the gripping fingers 78.

At its upper or outer axial end, the gripping surface or portion 82 is formed to provide an outwardly-presented abutment shoulder 84 positioned for endwise axial thrusting engagement by the free ends of the fingers 78 at the inception of each inward plunger stroke, thus to produce the desired maximum seating thrust from the plunger to the valve. Preferably, the shoulder 84 is of conically-tapered or flaring conformation as shown so that, after the inlet valve is seated, the shoulder 84 will exert a radially-outward spreading action of the inner ends of the fingers 78, as they move on to the cylindrical gripping surface 82, without arresting or unduly obstructing the plunger movement. The outwardly-deflected fingers will then cooperate with the surface 82 to transmit a frictional seating thrust to the valve during a subsequent portion of the plunger compression stroke.

The axially-inner extremity of the radially-enlarged gripping surface 82 of the plunger stem preferably is so located that the gripping fingers will ride off of it and over a downwardly or inwardly-tapered shoulder 86 for movement onto the adjoining smaller diameter portion 74b of the valve stem to the relative axial position substantially as shown in FIGURE 1, when the plunger is moved to its fully-depressed position.

Thus, it will be apparent that, during the latter stages of the plunger compression stroke, the frictional clutching engagement or coupling between the plunger and the inlet valve will have been substantially wholly released or disengaged by movement of the clutching fingers 78 onto the reduced diameter portion 74b of the valve stem. However, substantially concurrently with such disengagement, it will be apparent that the compression of the spring 16 by the plunger will have caused the constricted spring coil 80 to engage the inlet valve 26 proper to transmit a seating thrust thereagainst and to maintain a constant resilient seating thrust against the valve when the plunger is secured in its fully-depressed position by interengagement of its threaded plug 62 in the internally-threaded socket 60 of the cylinder. Such cooperation between the constricted spring coil 80 and the valve 26 is disclosed per se in the earlier-mentioned Corsette Patent 3,128,018.

It is particularly important to observe that in the fully-depressed position of the plunger, as illustrated in FIGURE 1, the gripping fingers or clutch fingers 78 engage the valve stem 74 at a location spaced axially inwardly from the innermost shoulder 86 of the valve stem. The relative spacing between these parts will normally be such that, when the plunger is released from its fully-depressed position of FIGURE 1 to be projected outwardly on its suction stroke by the spring 16, the constricted coil 80 of the spring will have moved outwardly away from the inlet valve 26 before the fingers 78 re-engage the shoulder 86. Accordingly, the operation is such as to avoid interference by the spring with unseating of the valve 26 in response to the plunger movement. During such movement and prior to engagement of the fingers with the shoulder 86, the plunger will have gained substantial upward momentum which is available to augment the pressure of the spring for freeing or unseating the valve 26 in the event it should have become stuck in its seated position, as for instance by the adhesive action of viscous or pasty materials. The inclination of the shoulder 86 is, of course, sufficient to transmit an appreciable unseating thrust from the plunger to the inlet valve when the free ends of fingers 78 engage the said shoulder, but is insufficient to arrest the continued upward movement of the plunger after the valve has been fully unseated. Rather, as the unseating movement of the valve is arrested by its re-engagement with the constricted spring coil 80, the free ends of the fingers 78 will be cammed radially outwardly by the tapered shoulder 86 to ride upwardly onto the cylindrical gripping surface 74.

The frictional gripping engagement of the fingers with this surface throughout the major portion of the ensuing suction stroke of the plunger will maintain the inlet valve unseated independently of the action of gravity, until such time as the fingers ride off of the portion or surface 82 and onto the relatively-smaller diameter upper end portion 74c of the valve stem near the upper extremity of the plunger suction stroke. At this time, the fingers will be positioned for imparting a more positive or maximum thrust against the axially-opposing shoulder 84 at the inception of the next downward or compression stroke. Incidentally, it is to be noted that the fingers throughout their downwardly or inwardly-pressing engagement with the tapered stem shoulder 84 will inherently function in the manner of toggle arms, in that each will exert a lengthwise thrust from the plunger to the shoulder 84.

The diameters of both of the relatively-relieved or smaller portions 74b and 74c of the valve stem 74 adjacent to respect shoulders 84 and 86 may, if desired, be such as to completely release the frictional clutching engagement between the fingers and the valve stem, thus to permit the inlet valve 26 to be seated by gravity if the plunger is permitted to come to rest in its fully-raised or projected position as shown in FIGURE 2.

In the operation of the invention, which is believed to be readily apparent from the above-mentioned description, when the plunger 12 is retained in its fully-depressed position as shown in FIGURE 1, the inlet valve 26 will be maintained resiliently seated by engagement with the constricted coil 80 of the compressed spring 16 and will thus cooperate with the external sealing means provided at 64 and 66 for preventing escape of liquid upwardly or outwardly either through the plunger passage 28 or between the plunger and cylinder. Release of the plunger to commence its outward suction stroke under the pressure of the spring 16 will result in the transmission from the plunger to the inlet valve 26 of a substantial or strong unseating thrust between the fingers 78 and the axially-directed shoulder 86. However, this thrust will be applied only after the release of the valve 26 from the seating resilient pressure applied to it by the constricted spring coil 80, and at a time when the plunger has gathered momentum to augment the force of the spring in breaking loose the valve in the event it should have become stuck in its seated position. Thereafter throughout the major portion of the suction stroke, a yielding frictional unseating force is maintained on the valve, through its yieldable connection to the plunger via the fingers 78 and portion 82 of the valve stem until such time as the friction fingers are disengaged from the frictional gripping surface 82 of the plunger stem near the upward extremity of the plunger stroke. At this time, the valve will normally be permitted to seat by gravity, due to its disengagement from the plunger.

Upon the inception of each inward or compression plunger stroke, the fingers 78 will abut against the valve stem shoulder 84 to transmit a maximum seating thrust to the valve. Subsequent to seating of the valve, the free ends of the fingers will ride inwardly over and in frictional engagement with the frictional gripping surface 82 to transmit a yielding seating force to the valve for at least a portion of the subsequent plunger stroke. Although the said frictional engagement may, and preferably will, be discontinued appreciably before the end of the stroke, the constricted valve spring coil 80 will then take over their function for the balance of the stroke and at the end of the stroke, if the plunger is locked in its fully-depressed position as in FIGURE 1, will continue to exert a resilient constant seating pressure on the valve.

By virtue of the interrelationship and interconnections between the plunger and inlet valve as above disclosed, it will be readily apparent that the improved pump of the invention will be rendered capable of operation in any position independently of gravity, and that its ability to handle materials of a nature adapted to interfere with proper valve seating will be greatly enhanced.

Having thus described my invention, I claim:

1. A liquid dispensing pump comprising a pump cylinder adapted for disposition through the discharge outlet of a liquid container, said cylinder having an open outer axial end and being provided with an inlet port adjacent its inner end, a plunger disposed for axial reciprocation in said cylinder through the open outer end thereof and jointly with said cylinder defining a variable volume pump chamber, said plunger being formed with part of a discharge passage extending axially therethrough from the pump chamber, means within said discharge passage for preventing substantial backflow of liquid toward the pump chamber, an inlet valve operatively associated with said inlet port for axial opening and closing movement relative to the inlet port, means for confining the inlet valve to a predetermined range of operative movement between its open and closed positions, said range being substantially less than the amplitude of the plunger reciprocation, said inlet valve including a portion extending axially through the pump chamber and into said passage for telescopic association with the inner end portion of the plunger, said telescopically-associated portions of the inlet valve and plunger being relatively spaced and proportioned to provide clearance space within said discharge passage, and clutch means within said passage arranged to permit liquid flow through the passage while establishing a yieldable coupling between the plunger and said inlet valve for transmitting axial movement from said plunger to the inlet valve to actuate said inlet valve in response to and in coordination with the movement of the plunger, said clutch means comprising a plurality of gripping fingers in annular configuration around said valve portion in axially parallel planes thereto, said fingers having inwardly directed generally convergent free ends in frictional engagement with said valve portion and relatively outwardly divergent ends fixedly connected to the inner wall of said plunger around the periphery of the discharge passage.

2. A liquid dispensing pump as defined in claim 1, including means for resiliently urging said free ends of the fingers radially into gripping engagement with the other said portion.

3. A liquid dispensing pump as defined in claim 2, in which said last-mentioned means comprises a coil spring, said other portion of the valve comprising a valve stem, said coil spring encircling said valve stem and being compressed axially between said cylinder and the fingers, said fingers jointly defining a spring seat for abutting engagement with the outer end of said coil spring at locations spaced radially from the connections of the respective fingers to said one portion and urging said fingers angularly about said connections in axial planes of the cylinder.

4. A liquid dispensing pump as defined in claim 1, in which said portion of the inlet valve extending into said passage comprises a rigid valve stem.

5. A liquid dispensing pump as defined in claim 4, in which said valve stem is formed with a generally-cylindrical frictional gripping surface for engagement with the free ends of said fingers to transmit a yielding axial thrust from the plunger to the inlet valve throughout the major portion of each plunger stroke.

6. The structure defined in claim 5, in which said gripping surface merges axially with radially-relieved sections of the valve stem to substantially disengage said yieldable coupling near both ends of the plunger stroke, whereby the inlet valve may be closed by gravity as the plunger arrives at the limit of its outward stroke, and whereby the plunger is freed from the inlet valve near the end of each inward stroke to thus freely commence its next outward stroke independently of the inlet valve, and, in the event the latter shall have become stuck, to thus gather momentum for freeing the inlet valve when said coupling is subsequently re-engaged.

7. The structure defined in claim 6, in which said radially-relieved section of the valve stem adjacent the outer axial end of the gripping surface is tapered to define an outwardly-presented abutment shoulder for endwise thrusting engagement of said fingers at the inception of each inward stroke of the plunger to transmit an increased seating thrust to the inlet valve at the inception of each inward plunger stroke.

8. In a device as defined in claim 7, means for releasably securing the plunger in its fully inwardly-depressed position within the cylinder, a plunger spring compressed between said plunger and said cylinder, and having a constricted coil axially positioned for abutting closing engagement with the inlet valve at the inward extremity of the plunger movement, said radially-relieved section of the valve stem adjacent the inner axial end of said frictional gripping section of the valve stem being tapered to define an inwardly-presented shoulder for abutting engagement with said fingers to transmit a maximum unseating force to the valve shortly after inception of each outward plunger stroke.

References Cited

UNITED STATES PATENTS

| | | | |
|---|---|---|---|
| 2,180,702 | 11/1939 | Berwick et al. | 222—321 |
| 3,228,347 | 1/1966 | Corsette | 103—178 |

DONLEY J. STOCKING, *Primary Examiner.*

WILLIAM L. FREEH, *Examiner.*